United States Patent [19]

Toda

[11] Patent Number: 5,064,139
[45] Date of Patent: Nov. 12, 1991

[54] FISHING REEL WITH CLICK-FREE ANTI-REVERSE MECHANISM

[75] Inventor: Junichi Toda, Sakai, Japan

[73] Assignee: Shimano Industrial Company Limited, Osaka, Japan

[21] Appl. No.: 471,781

[22] Filed: Jan. 29, 1990

[30] Foreign Application Priority Data

Jan. 30, 1989 [JP] Japan ................ 1-10038[U]

[51] Int. Cl.⁵ ............................................. A01K 89/02
[52] U.S. Cl. .................................... 242/295; 242/317
[58] Field of Search .............. 192/45.1, 47; 242/295, 242/306, 307, 317

[56] References Cited

U.S. PATENT DOCUMENTS

| | | | |
|---|---|---|---|
| 1,798,918 | 3/1931 | Wehinger | 192/47 |
| 2,306,259 | 12/1942 | Khoenle | 242/295 |
| 2,988,186 | 6/1961 | Dotter | 192/47 |
| 3,648,809 | 3/1972 | Schwerdhofer | 192/47 |
| 3,971,530 | 7/1976 | Murvall | 242/306 |
| 4,168,041 | 9/1979 | Moosberg | 242/295 |
| 4,515,325 | 5/1985 | Ito | 242/295 |
| 4,629,044 | 12/1986 | Post et al. | 192/47 |

FOREIGN PATENT DOCUMENTS 40-31097 11/1965 Japan .
6013359 11/1965 Japan .

Primary Examiner—Daniel P. Stodola
Assistant Examiner—Charles T. Riggs, Jr.
Attorney, Agent, or Firm—Dickstein, Shapiro & Morin

[57] ABSTRACT

A fishing reel having a reel body, a spool rotatably supported to the reel body, a spool braking plate for braking the spool, a unidirectional rotation transmitting mechanism disposed between the spool and the spool braking plate, the mechanism having anti-reverse teeth and a stopper claw. The mechanism prevents reverse rotation of the spool through engagement between the anti-reverse teeth and the stopper claw. The fishing reel is characterized by a stopper-claw control member attached to a rotary member opposing to the spool braking plate to be rotatable within a predetermined angular range. The control member has a control portion engageable with the stopper claw for controlling engagement and disengagement of the stopper claw.

5 Claims, 5 Drawing Sheets

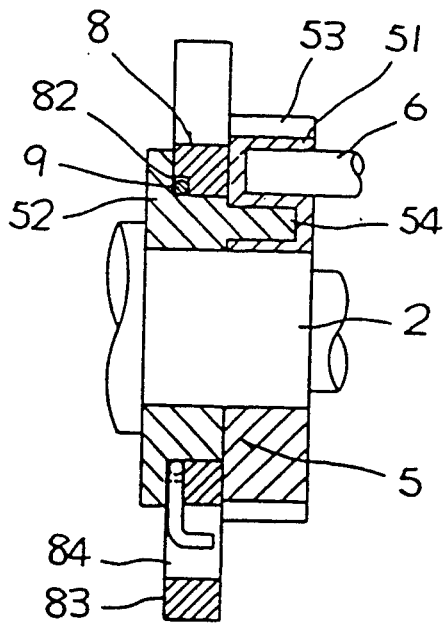
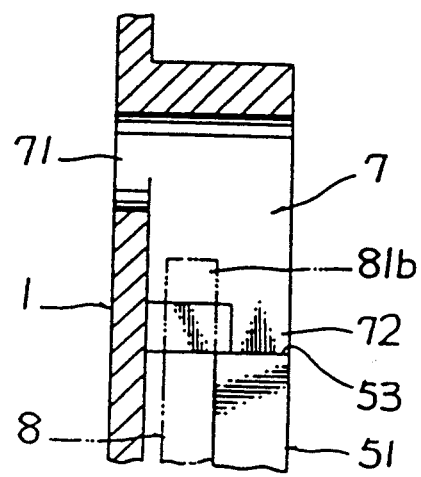
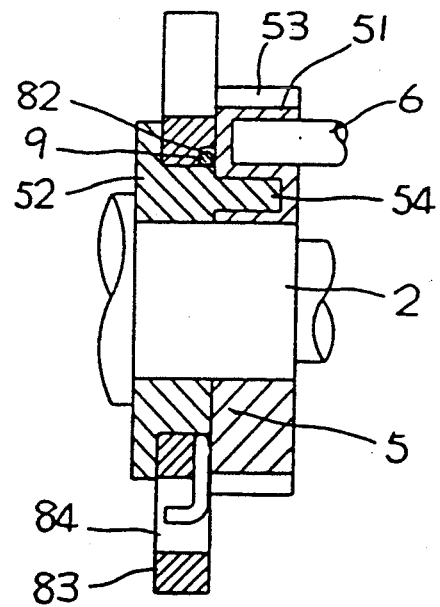

ically supported to the reel 50 showing major portions of the fishing reel of this em-

FISHING REEL WITH CLICK-FREE ANTI-REVERSE MECHANISM

BACKGROUND OF THE INVENTION

1. Field of the Invention

The present invention relates to a fishing reel.

2. Description of the Prior Art

In a conventional fishing reel as disclosed in e.g. a Japanese published patent gazette No. 40-31097, a spool and a spool braking plate are rotatably supported via a spool shaft at center portions in a cylindrical reel body. Between the spool and the spool braking plate, there is interposed a unidirectional rotation transmitting mechanism having anti-reverse teeth, a stopper claw engageable with the anti-reverse teeth and a claw spring for urging the stopper claw to the anti-reverse teeth. Further, there is provided an adjusting member for applying an adjustable braking force against rotation of the braking plate. In operation, for a forward rotation in which the spool is rotated in a direction to wind a fishing line. the leading end of the stopper claw is moved away and thus disengaged from the anti-reverse tooth so as to render the spool freely rotatable relative to the spool braking plate. Conversely, for a reverse rotation of in which the spool is rotated in the opposite direction to feed the fishing line, the stopper claw is kept engaged with one of the anti-reverse teeth so as to render the spool braking plate rotatable together with the spool, thereby to apply resistance to the spool rotation.

The above-described conventional fishing reel does not have any means for controlling the movements of the stopper claw of the unidirectional rotation transmitting mechanism. That is, the stopper claw is constantly urged to the anti-reverse teeth by means of the claw spring. As a result, during the forward rotation for winding the fishing line, as the leading end of the stopper claw repeatedly comes in and out of engagement with the anti-reverse teeth with the spool rotation, there occurs rather large annoying clicking noise.

The present invention attends to the above problem of the prior art and its primary object is to provide an improved fishing reel which is free from the annoying clicking noise generated by the stopper claw during a forward rotation of the spool.

SUMMARY OF THE INVENTION

In order to accomplish the above-noted object, a fishing reel relating to the present invention comprises: a reel body; a spool rotatably supported to the reel body; a spool braking plate for braking the spool; a unidirectional rotation transmitting mechanism disposed between the spool and the spool braking plate, the mechanism having anti-reverse teeth and a stopper claw, the mechanism preventing reverse rotation of the spool through engagement between the anti-reverse teeth and the stopper claw; and a stopper-claw control member attached to a rotary member opposing to the spool braking plate to be rotatable within a predetermined angular range, the control member having a control portion engageable with the stopper claw for controlling engagement and disengagement of the stopper claw.

Functions and effects of the above-described construction will be described next.

In accordance with a forward or reverse spool rotation, the stopper-claw control member rotates within the predetermined angular range via the rotary member. That is, with an angular movement of this stopper-claw control member in the forward rotation direction of the spool, the control portion acts to release the engagement between the stopper claw and the anti-reverse teeth. After this angular movement of the control member, if the spool is further rotated in the forward direction, the spool becomes freely rotatable relative to the spool braking plate. In this condition, since the engagement between the stopper claw and the anti-reverse teeth has already been released as described above, the further forward rotation of the spool does not cause any contact between the teeth and the claw. Accordingly, there occurs no annoying clicking noise.

Conversely, with an opposite angular movement of the stopper-claw control member in the reverse rotation direction of the spool, the control portion acts to cause engagement between the stopper claw and the anti-reverse teeth, thereby to reversely rotate the spool braking plate together with the spool.

As described above, with the characterizing features of the invention, the problem of the noise generation from the repeated engagement and disengagement between the stopper claw and the anti-reverse teeth can be advantageously prevented. Further and other objects, features and effects of the invention will become apparent from the following more detailed description of the embodiments of the invention with reference to the accompanying drawings.

BRIEF DESCRIPTION OF THE DRAWINGS

Accompanying drawings, FIGS. 1 through 5 illustrate one preferred embodiment of a fishing reel relating to the present invention; in which, FIG. 1 is a vertical section of the fishing reel, FIG. 2 is a side view in vertical section showing major portions of the reel, FIG. 3 is a view illustrating operational conditions of the fishing reel, FIG. 4 is a side view in an enlarged vertical section showing a clutch spring used in the reel, and FIG. 5 is an enlarged cross section showing a stoper claw of the reel;

FIGS. 6 and 7 illustrate a further embodiment of the present invention; in which, FIG. 6 is a side view in an enlarged vertical section showing a clutch spring used in a fishing reel relating to the further embodiment, and FIG. 7 is a side view in an enlarged vertical section showing major portions of the fishing reel of this embodiment.

DESCRIPTION OF THE PREFERRED EMBODIMENTS

Preferred embodiments of a fishing reel relating to the invention will be particularly described next with reference to the accompanying drawings.

Figure 1:
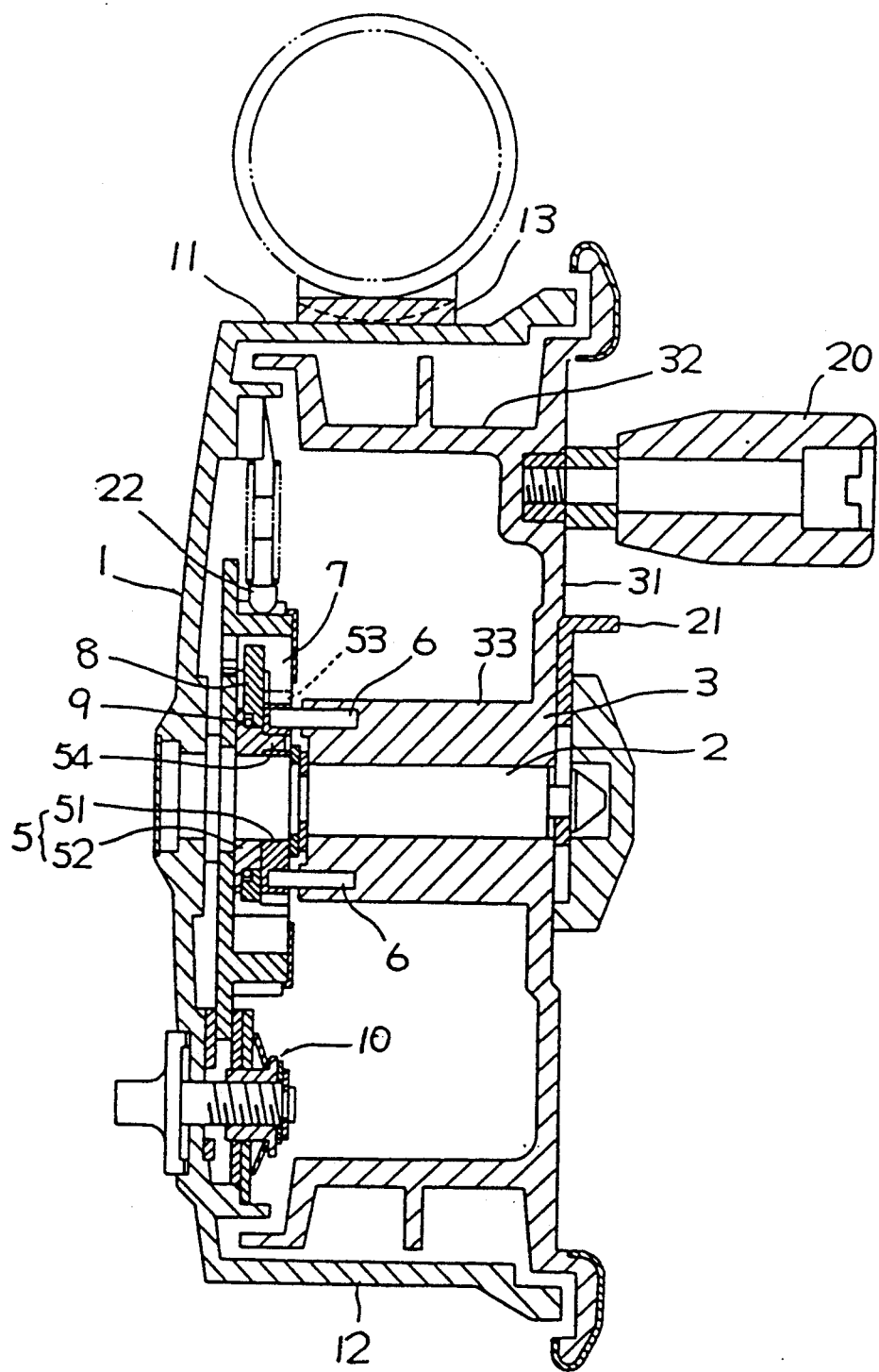
Figure 2:
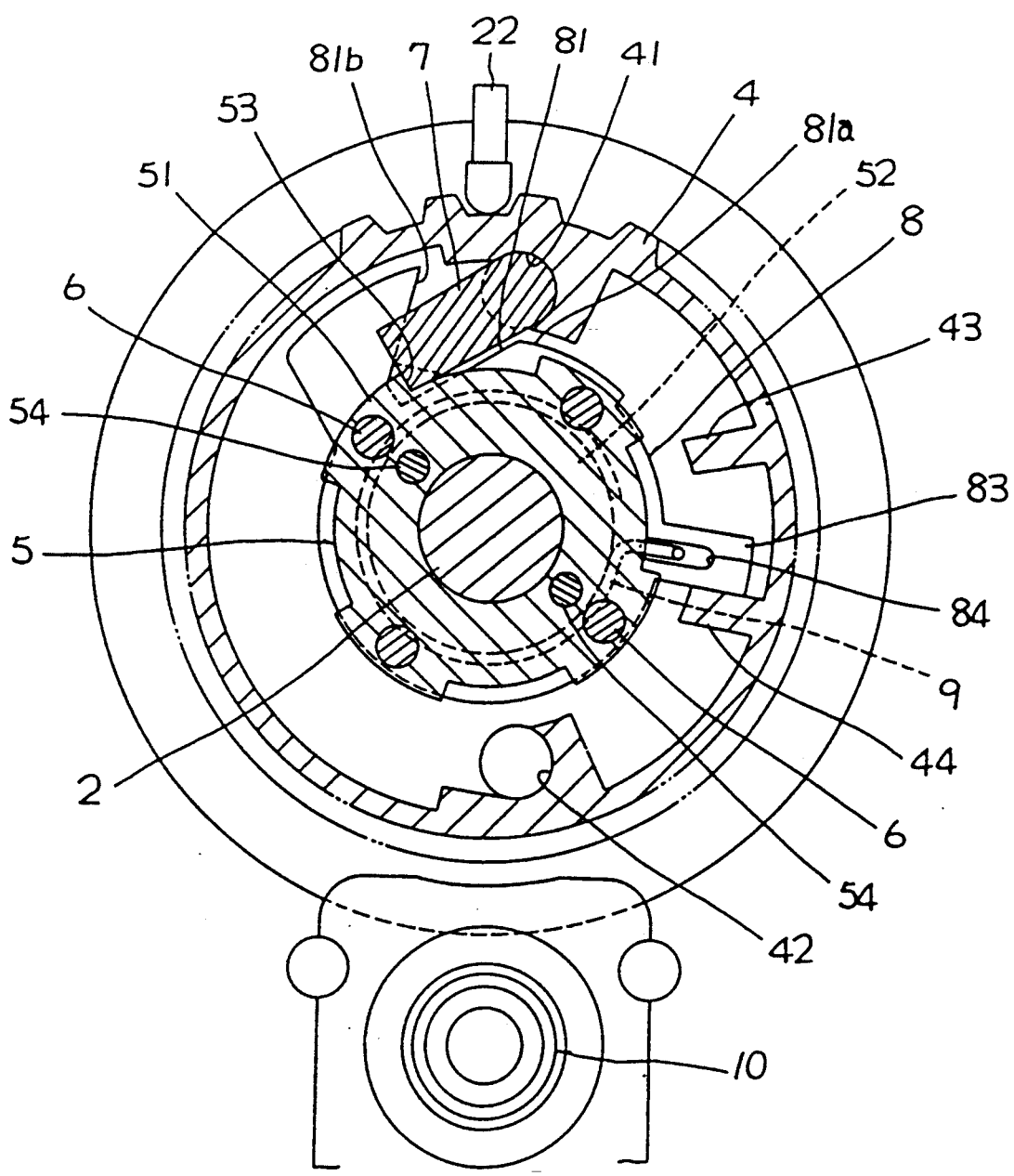

In FIG. 1, a reference numeral 1 denotes a reel body having a cylindrical configuration. At a central portion in this reel body 1, there is attached a spool shaft 2 by means of attaching screws. A spool is denoted generally at a reference numeral 3. This spool 3 includes a round base plate 31 positioned in opposition to the reel body 1, a grooved peripheral wall 32 provided on an outer peripheral edge of the round base plate 31 and a hollow shaft portion 33 extending from the center of the round base plate 31. The hollow shaft portion 33 is detachably fitted on the spool shaft 2. Referring to FIG. 2, the spool shaft 2 rotatably mounts thereon, at axial positions thereof between the reel body and the spool, a spool braking plate 4 having a round plate configuration and an anti-reverse gear 51 which defines anti-reverse teeth in its outer periphery and which is formed like a round plate. The anti-reverse gear 51 and the hollow shaft portion 33 are operatively connected via connector pins 6 so that the anti-reverse gear 51 rotates in unison with the spool 3. The braking plate 4 pivotably supports a stopper claw 7 engageable with the anti-reverse teeth 53. The stopper claw 7 and the anti-reverse teeth 53 together constitute a unidirectional rotation transmitting mechanism to be described later.

At one peripheral side of the reel body 1 relative to the spool shaft 2, there is mounted an adjusting member 10 for providing an adjustable, i.e. variable braking force against rotation of the braking plate 4 by binding an outer peripheral portion of the braking plate 4. In operation, when the spool 3 is rotated in a forward direction for winding a fishing line, the spool 3 is freely rotatable relative to the spool braking plate 4. Conversely, when the spool 3 is rotated in a reverse direction for feeding the fishing line, the braking plate 4 is rotated together with the spool 3 via the unidirectional rotation transmitting mechanism so that the plate 4 applies resistance against the rotation of the spool 3.

In the embodiment illustrated in FIGS. 1 through 5, between the braking plate 4 and the anit-reverse gear 51 opposing to the braking plate 4, there are interposed a spring receiver barrel 52 having engaging projections 54 and a stopper-claw control member 8 capable of angular movements within a predetermined range around the spring receiver barrel 52. The spring receiver barrel 52 is rotatable in unison with the anti-reverse gear 51 via the engaging projections 54. Thus, these anti-reverse gear 51 and the spring receiver barrel 52 together constitute a rotary member 5. The spring receiver barrel 52 supports, on its outer periphery, a ring-shaped clutch spring 9 as a friction member operable with a forward or reverse rotation of the spring receiver barrel 52. This clutch spring 9 has its one end stopped by the stopper-claw control member 8. On the other hand, the control member 8 includes a control portion 81 selectively engageable with the stopper claw 7 for controlling engagement and disengagement of this stopper claw 7.

The stopper-claw control member 8 is formed like a round plate defining, in its inner periphery, an annular groove 82 for receiving the clutch spring 9. Whereas, at a position on the outer periphery of this control member 8, the control portion 81 is formed. At a further position of the outer periphery of the control member 8, there is formed an engaging projection 83 projecting radially outwardly from the periphery. This engaging projection 83 includes a spring hook hole 84. The control portion 81 includes a bulging portion 81a engageable with a lower face of the stopper claw 7 facing the anti-reverse teeth for raising the stopper claw 7 and a depressing portion 81b engageable with an upper face of the leading end of the stopper claw 7 for depressing the stopper claw 7. The bulging portion 81a and the depressing portion 81b are spaced apart from each other by a distance corresponding to the angular stroke of the control member 8.

The braking plate 4 includes, on one side face thereof, a cylindrical portion having a reduced diameter relative to the plate 4. This cylindrical portion includes, in its inner periphery, a pair of claw supports 41 and 42 and a pair of rotation regulating elements 43 and 44. One claw support 41 supports the stopper claw 7 pivotably relative thereto. Also, the aforementioned engaging projection 83 is positioned between the pair of rotation regulating elements 43 and 44. Accordingly, with a rotation of the control member 8, the engaging projection 83 comes into abutment against one of the rotation regulating elements 43 and 44 so as to regulate the pivotal range of the control member 8.

The ring-shaped clutch spring 9 has its inner peripheral face loosely fitted on the outer periphery of the spring receiver barrel 52 and has one end bent in a radially outward direction so as to be stopped at the spring hook hole 84.

The functions and operations of the above-described construction will be described next.

With forward rotation of the spool 3 and the spring receiver barrel 52, the stopper-claw control member 8 is also rotated via the clutch spring 9 through frictional resistance between the spring receiver barrel 52 and the clutch spring 9. Then, the bulging portion 81a of the control portion 81 of this control member 8 comes into contact with the lower face of the stopper claw 7 thereby to raise this stopper claw 7 and consequently to release engagement between the stopper claw 7 and the anti-reverse teeth 53. Simultaneously therewith, the engaging projection 83 comes into contact with the rotation regulating element 43 thereby to prevent the stopper-claw control member 8 from being rotated with the spring receiver barrel 52. Then, as slippage occurs between the clutch spring 9 whose one end is stopped by the control member 8 and the spring receiver barrel 52, the spring receiver barrel 52 becomes rotatable relative to the spool braking plate 4.

Conversely, with reverse rotation of the spool 3 and the spring receiver barrel 52, the control member 8 is also rotated via the clutch spring 9 through the frictional resistance between the spring receiver barrel 52 and the clutch spring 9. Then, the depressing portion 81b of the control portion 81 of this control member 8 comes into contact with an upper face of the leading end of the stopper claw 7 thereby to depress this stopper claw 7 and consequently to engage the claw 7 with the anti-reverse teeth 53. As a result, the reverse rotation of the spring receiver barrel 52 is transmitted via the stopper claw 7 to the spool braking plate 4 so as to rotate this braking plate 4.

Incidentally, with the reverse rotation of the spring receiver barrel 52, the rotation of the control member 8 relative to the braking plate 4 is limited and the ring-shaped clutch spring 9 becomes tightly, i.e. unmovably wound about the spring receiver barrel 52.

As shown in FIG. 5, the stopper claw 7 includes a shaft portion 71 insertible into an engaging hole defined in the spool braking plate 4 and a rectangular claw portion 72 extending radially and outwardly from an end of the shaft portion 71. This claw portion 72 has a width greater than a tooth width of the anti-reverse teeth 53. Also, the bulging portion 81a comes into contact with a width-wise lower face of the claw portion 71; whereas, the depressing portion 81b comes into contact with an upper face of the claw portion 71. This upper face of the claw portion 71 which comes into contact with the depressing portion 81b should preferably be inclined as illustrated in FIG. 2.

Referring to other elements illustrated in the drawings, numeral 20 denotes a handle of the spool 3, numerals 11 and 12 denote rod elements provided at upper and lower portions of the reel body 1, numeral 13 denotes a mount leg attached to the upper rod element 11 for mounting the reel to a fishing rod, numeral 21 denotes a slide lever for detachably mounting the spool 3 on the spool shaft 2, and numeral 22 denotes a clicking claw which comes into engagement with clicking teeth defined on the outer periphery of the braking plate 4 so that the engagement generates a click sound with rotation of the braking plate 4.

The fishing reel shown in FIG. 1 is adapted for right-handed user. When the user holds the handle 20 to forwardly rotate the spool 3 for winding the fishing line, the spring receiver barrel 52 is rotated via the rotary member 5 counterclockwise in FIG. 2. Then, the stopper-claw control member 8 comes into weak contact with the outer periphery of the spring receiver barrel 52 and is rotated via the clutch spring 9 together with the rotation of the spool 3 counterclockwise in FIG. 2. With this rotation of the control member 8, as illustrated in FIG. 3, the bulging portion 81a of the control portion 81 of the control member 8 comes into contact with the lower face of the stopper claw 7 to raise this claw 7 thereby to release engagement between the stopper claw 7 and the anti-reverse teeth 53.

Then, as the engaging projection 83 comes into contact with the rotation regulating element 43, the control member 8 is prevented from being rotated together with the spool 3, and as slippage occurs between the clutch spring 9 and the spring receiver barrel 52, this spring receiver barrel 52 becomes rotatable relative to the spool braking plate 4. Accordingly, the spool 3 can be forwardly rotated without any clicking noise by the stopper claw 7.

Figure 3:
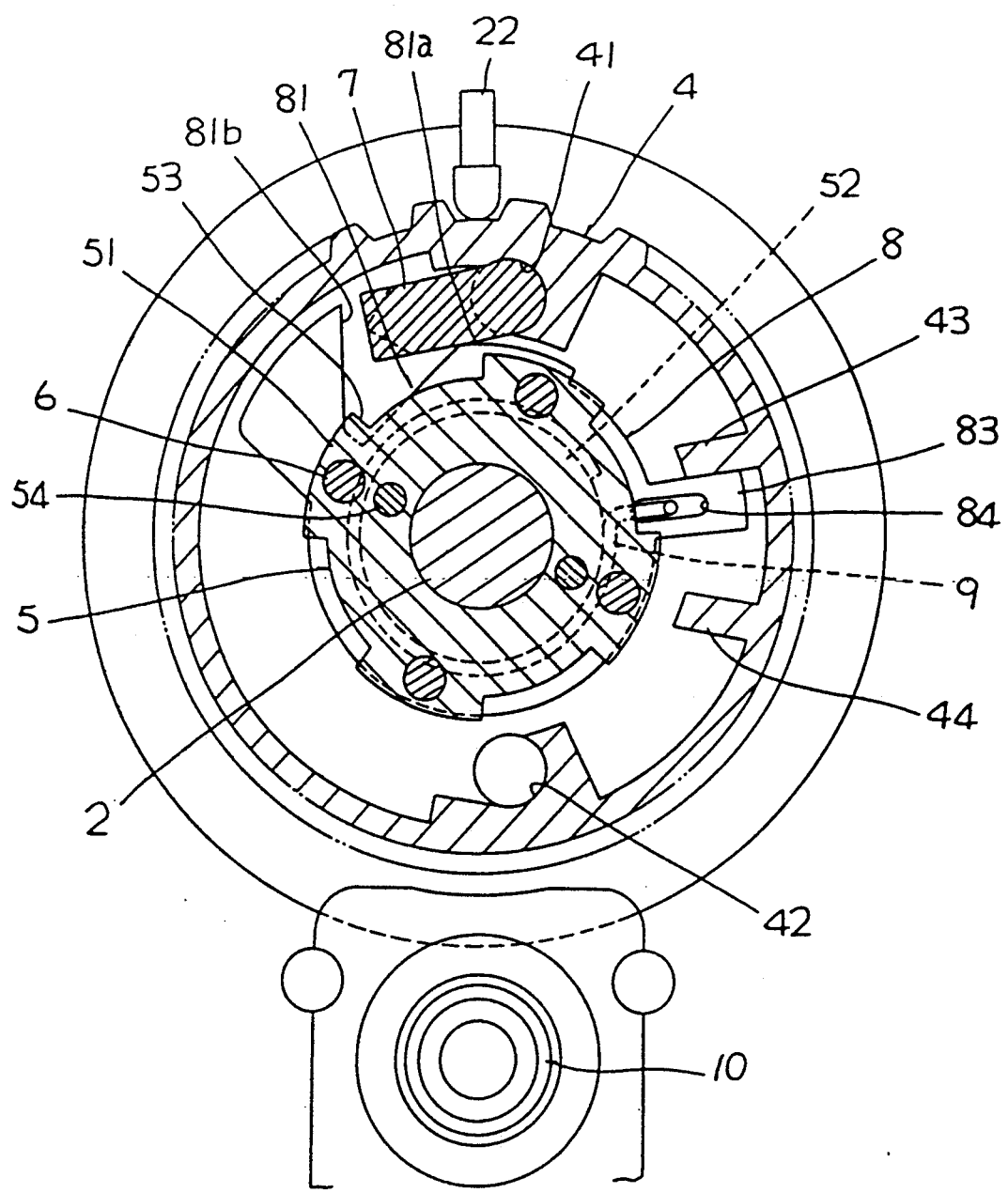

Conversely, when the spool 3 is reversely rotated by a pulling force of a caught fish, the spring receiver barrel 52 is rotated via the rotary member 5 clockwise in FIG. 3. Simultaneously therewith, the stopper-claw control member 8 makes a clockwise (in FIG. 3) angular movement, i.e. rotation with the rotation of the spool 3 via the clutch spring 9 which is in the weak contact with the outer peripheral face of the spring receiver barrel 52. With this rotation of the stopper-claw control member 8, the depressing portion 81b of the control portion 81 of the control member 8 comes into contact with the upper face of the leading end of the stopper claw 7 thereby to depress the stopper claw 7 and consequently to engage the claw 7 with the anti-reverse teeth 53. Accordingly, the reverse rotation of the spool 3 is transmitted to the spool braking plate 4 through the unidirectional rotation transmitting mechanism including the anti-reverse teeth 53 and the stopper claw 7, whereby the braking plate 4 rotates together with the spool 3. In this case, since the adjusting member 10 provides frictional resistance against the rotation of the braking plate 4, the spool 3 can be rotated with the predetermined amount of resistance. Also, with the reverse rotation of the spring receiver barrel 52, the stopper-claw control member 8 rotates together with the spool braking plate 4.

Figure 7:
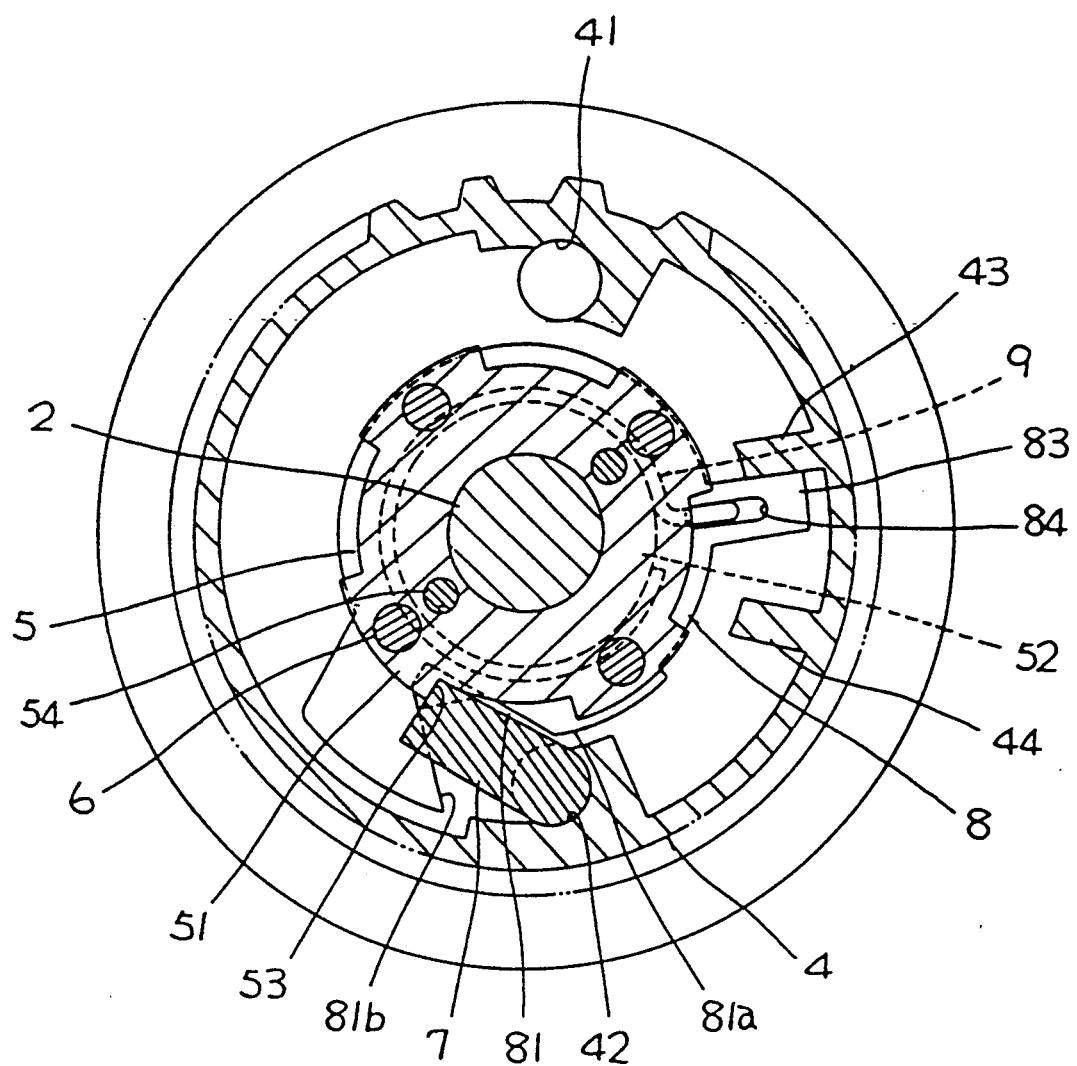

For adapting the fishing reel from the right-handed type illustrated in FIG. 1 to a left-handed type, as shown in FIGS. 6 and 7, the stopper claw 7 is detached from the claw support 41 and pivotably attached to the other claw support 42 with the claw 7 being pivotable relative to the support 42 in a direction opposite to the pivotal direction of the claw 7 relative to the support 41. Also, the control member 8 is sidewise reversed and the engaging projection 83 is interposed between the rotation regulating elements 43 and 44.

In this case also, the stopper-claw control member 8 effects an angular movement, i.e. partial rotation via the clutch spring 9. That is, with a forward rotation of the spool 3, the stopper-claw control member 8 rotates clockwise in FIG. 7. Then, the stopper claw 7 is pushed up by the bulging portion 81a of the control member 8 and engagement between the claw 7 and the anti-reverse teeth 53 is released. In the course of the above operation, since the engaging projection 83 comes into contact with the rotation regulating element 44 to prevent the control member 8 from being rotated together with the spool 3, the above-described pushed-up state of the stopper claw 7 can be maintained. Accordingly, in this case also, the spool 3 can be rotated without any clicking noise by the stopper claw 7.

Conversely, when the spool 3 is rotated reversely by a pulling force of a caught fish, the control member 8 is also rotated reversely. With this reverse rotation of the control member 8, the raised stopper claw 7 becomes depressed by the depressing portion 81b of the control member 8 and thus becomes engaged with the anti-reverse teeth 53. In this condition, as the engaging projection 83 comes into contact with the rotation regulating element 43, the stopper-claw control member 8 rotates together with the spool braking plate 4. Accordingly, the reverse rotation of the spool 3 is transmitted to the braking plate 4 via the undirectional rotation transmitting mechanism having the anti-reverse teeth 53 and the stopper claw 7, and this braking plate 4 rotates in unison with the spool 3.

In the foregoing embodiments, the spool-side, rotary member 5 is formed separately from the spool 3. Instead, the member 5 and the spool 3 can be formed integrally with each other. Further, when these elements are formed as separate entities, the anti-reverse gear 51 and the spring receiver barrel 52 can be formed integrally with each other in place of the separate formation of these elements in the foregoing embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:
   a reel body;
   a spool rotatably supported to said reel body;
   a spool braking plate for braking said spool;
   a unidirectional rotation transmitting mechanism disposed between said spool and said spool braking plate, said mechanism having anti-reverse teeth and a stopper claw, said mechanism preventing reverse rotation of said spool through engagement between said anti-reverse teeth and said stopper claw; and
   a stopper-claw control member attached to a rotary member opposing to said spool braking plate to be rotatable within a predetermined angular range, said control member having a control portion engageable with said stopper claw for controlling engagement and disengagement of said stopper claw;

said control portion of said stopper-claw control member including a bulging portion for releasing said stopper claw with forward rotation of said spool and a depressing portion for engaging said stopper claw with reverse rotation of said spool;

said stopper claw including a claw portion having a width greater than a tooth width of said anti-reverse teeth, said bulging portion coming into contact with a widthwise lower face of said claw portion and said depressing portion coming into contact with an upper face of said claw portion.

2. A fishing reel as defined in claim 1, further comprising:

a friction member operable with a forward or reverse rotation of said rotary member to permit the predetermined angular range of rotation of said stopper-claw control member.

3. A fishing reel as defined in claim 1 or 2, wherein said spool is supported to said reel body via a spool shaft.

4. A fishing reel as defined in claim 1 or 2, wherein said spool braking plate brakes spool rotation via an adjusting member.

5. A fishing reel as defined in claim 1 or 2, wherein said friction member is a ring-shaped spring.

* * * * *